United States Patent
Ikeda et al.

(10) Patent No.: US 12,031,936 B2
(45) Date of Patent: Jul. 9, 2024

(54) GAS SENSOR ELEMENT

(71) Applicant: DENSO CORPORATION, Kariya (JP)

(72) Inventors: Masatoshi Ikeda, Nisshin (JP); Shota Hagino, Nisshin (JP); Makoto Ito, Kariya (JP); Daisuke Kawai, Kariya (JP)

(73) Assignee: DENSO CORPORATION, Kariya (JP)

( * ) Notice: Subject to any disclaimer, the term of this patent is extended or adjusted under 35 U.S.C. 154(b) by 662 days.

(21) Appl. No.: 17/181,212

(22) Filed: Feb. 22, 2021

(65) Prior Publication Data

US 2021/0181140 A1    Jun. 17, 2021

Related U.S. Application Data

(63) Continuation of application No. PCT/JP2019/031225, filed on Aug. 7, 2019.

(30) Foreign Application Priority Data

Aug. 23, 2018  (JP) .................. 2018-156179

(51) Int. Cl.
*G01N 27/406* (2006.01)
*G01N 27/407* (2006.01)
*G01N 27/409* (2006.01)
*H05B 3/03* (2006.01)
*H05B 3/18* (2006.01)

(52) U.S. Cl.
CPC ..... *G01N 27/4067* (2013.01); *G01N 27/4071* (2013.01); *G01N 27/409* (2013.01); *H05B 3/03* (2013.01); *H05B 3/18* (2013.01)

(58) Field of Classification Search
None
See application file for complete search history.

(56) References Cited

U.S. PATENT DOCUMENTS

2018/0356363 A1    12/2018  Igarashi et al.

FOREIGN PATENT DOCUMENTS

| JP | 2010-145214 | 7/2010 |
|---|---|---|
| JP | 2017-223488 | 12/2017 |
| JP | 2019-95359 | 6/2019 |

*Primary Examiner* — J. Christopher Ball
(74) *Attorney, Agent, or Firm* — Nixon & Vanderhye P.C.

(57) ABSTRACT

A gas sensor element has an electrolyte layer, a first insulator, a second insulator, a measurement gas chamber, and a reference gas chamber. The electrolyte layer includes a holding plate and a solid electrolyte body. The first insulator is laminated on one side of the electrolyte layer, and the second insulator is laminated on the other side of the electrolyte layer. At least a part of the boundary portion between the placement hole and the solid electrolyte body is sandwiched between a first sandwiching portion of the first insulator and a second sandwiching portion of the second insulator.

9 Claims, 8 Drawing Sheets

GAS SENSOR ELEMENT

CROSS REFERENCE TO RELATED APPLICATION

The present application is a continuation application of International Application No. PCT/JP2019/031225 filed on Aug. 7, 2019, which is based on and claims the benefit of priority from Japanese Patent Application No. 2018-156179 filed on Aug. 23, 2018. The contents of these applications are incorporated herein by reference in their entirety.

BACKGROUND

The present disclosure relates to a gas sensor element.

A gas sensor is disposed in the exhaust pipe of an internal combustion engine, for example, and is used to detect the concentration of a specific gas component, such as the oxygen concentration of the exhaust gas flowing through the exhaust pipe.

SUMMARY

According to one aspect, the present disclosure provides a gas sensor element comprising an electrolyte layer provided with a holding plate having a placement hole, and a solid electrolyte body disposed in the placement hole, a first insulator laminated on one side of the electrolyte layer, a second insulator laminated on the other side of the electrolyte layer, a measurement gas chamber that is surrounded by the electrolyte layer and the first insulator, and a reference gas chamber that is surrounded by the electrolyte layer and the second insulator, wherein:

at least a part of a boundary portion between the placement hole and the solid electrolyte body is sandwiched between a first sandwiching portion of the first insulator and a second sandwiching portion of the second insulator.

BRIEF DESCRIPTION OF THE DRAWINGS

The above objectives and other objectives, features and advantages of the present disclosure are made clearer by the following detailed description, referring to the appended drawings. In the drawings.

DETAILED DESCRIPTION OF THE PREFERRED EMBODIMENTS

Figure 1:
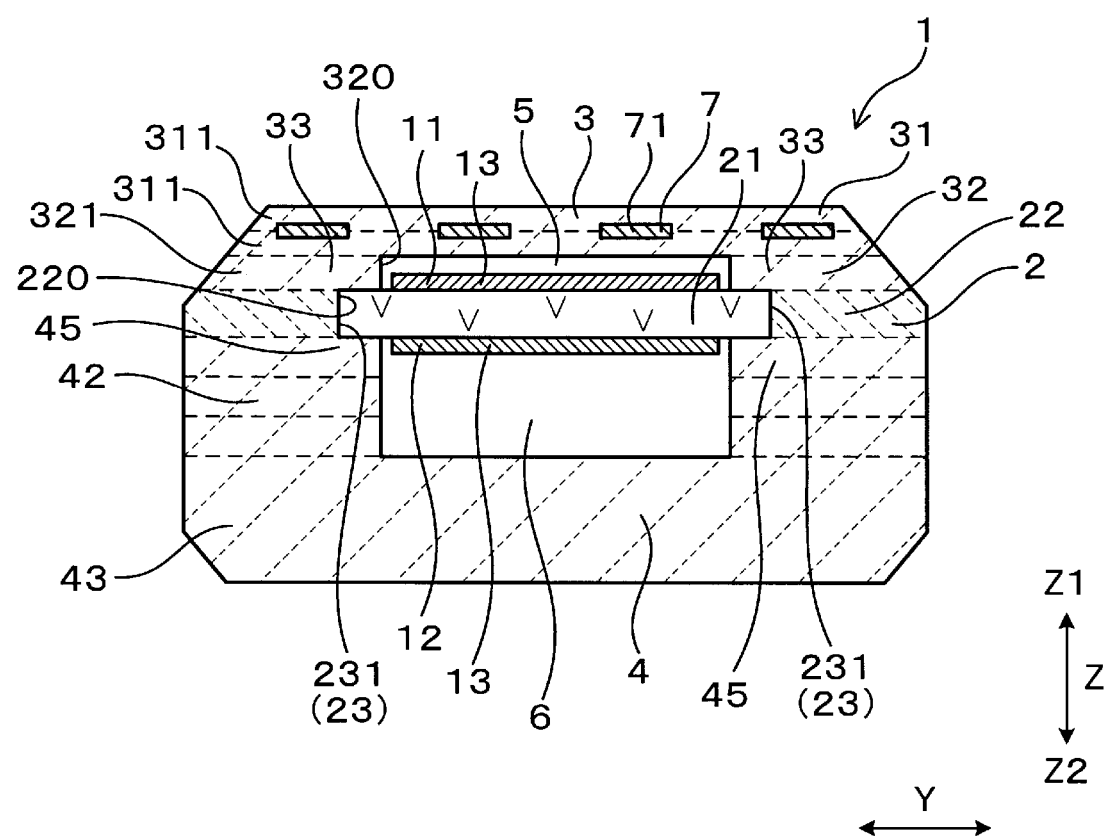
FIG. 1 is a cross-sectional view orthogonal to the longitudinal direction of the gas sensor element of the first embodiment.

The inventor of the present disclosure has studied a gas sensor element in which a solid electrolyte body does not readily become displaced from a placement hole.

As disclosed in JP 2010-145214 A, a gas sensor is disposed in the exhaust pipe of an internal combustion engine, for example, and is used to detect the concentration of a specific gas component, such as the oxygen concentration of the exhaust gas flowing through the exhaust pipe. The gas sensor described in JP 2010-145214 A includes a holding plate having a placement hole formed therein in the thickness direction, and an electrolyte layer having a solid electrolyte body that is disposed in the placement hole.

The gas sensor described in JP 2010-145214 A has a pair of surface alumina layers disposed on respective sides of the holding plate in the thickness direction, at the boundary portion between the placement hole and the solid electrolyte body. It is attempted in that way to prevent the solid electrolyte body from detaching from the alumina sheets.

With the gas sensor element described in JP 2010-145214 A, the thickness of the pair of surface alumina layers is relatively small and their strength is low. Hence there is scope for improvement, from the aspect of stability of holding the solid electrolyte body in the placement hole.

The present disclosure is intended to provide a gas sensor element in which a solid electrolyte body does not readily become displaced from a placement hole.

According to one aspect, the present disclosure provides a gas sensor element comprising an electrolyte layer provided with a holding plate having a placement hole formed in a thickness direction (Z), and a solid electrolyte body disposed in the placement hole and having oxygen ion conductivity, a first insulator laminated on one side of the electrolyte layer, a second insulator laminated on the other side of the electrolyte layer, a measurement gas chamber that is surrounded by the electrolyte layer and the first insulator, and into which a gas (G) to be measured is introduced, and a reference gas chamber that is surrounded by the electrolyte layer and the second insulator, and into which a reference gas (A) is introduced, wherein:

at least a part of a boundary portion between the placement hole and the solid electrolyte body is sandwiched between a first sandwiching portion of the first insulator and a second sandwiching portion of the second insulator, the first sandwiching portion is formed, in the thickness direction, at a position overlapping the boundary portion, and is formed, at least in the thickness direction, in the entire region where the measurement gas chamber is disposed, and the second sandwiching portion is formed, in the thickness direction, at a position overlapping the boundary portion, and is formed, at least in the thickness direction, in the entire region where the reference gas chamber is disposed.

In the gas sensor element of the above embodiment, at least a part of the boundary portion between the placement hole of the holding plate and the solid electrolyte body is sandwiched between a first sandwiching portion of the first insulator and a second sandwiching portion of the second insulator. The first sandwiching portion is formed on at least the entire region of the measurement gas chamber, in the thickness direction of the holding plate. Furthermore, the second sandwiching portion is formed on least the entire region of the reference gas chamber in the thickness direction. That is, at least a part of the boundary portion is sandwiched between the first sandwiching portion and the second sandwiching portion, which are formed of structures having relatively high rigidity. Hence, since it is easy to ensure rigidity of the first sandwiching portion and the second sandwiching portion which sandwich at least a part of the boundary portion, it is easy to stably hold the solid electrolyte body in the placement hole.

As described above, according to the above aspect, it is possible to provide a gas sensor element in which the solid electrolyte body does not easily become displaced from the placement hole.

First Embodiment

An embodiment of a gas sensor element will be described with reference to FIGS. 1 to 5.

Figure 2:
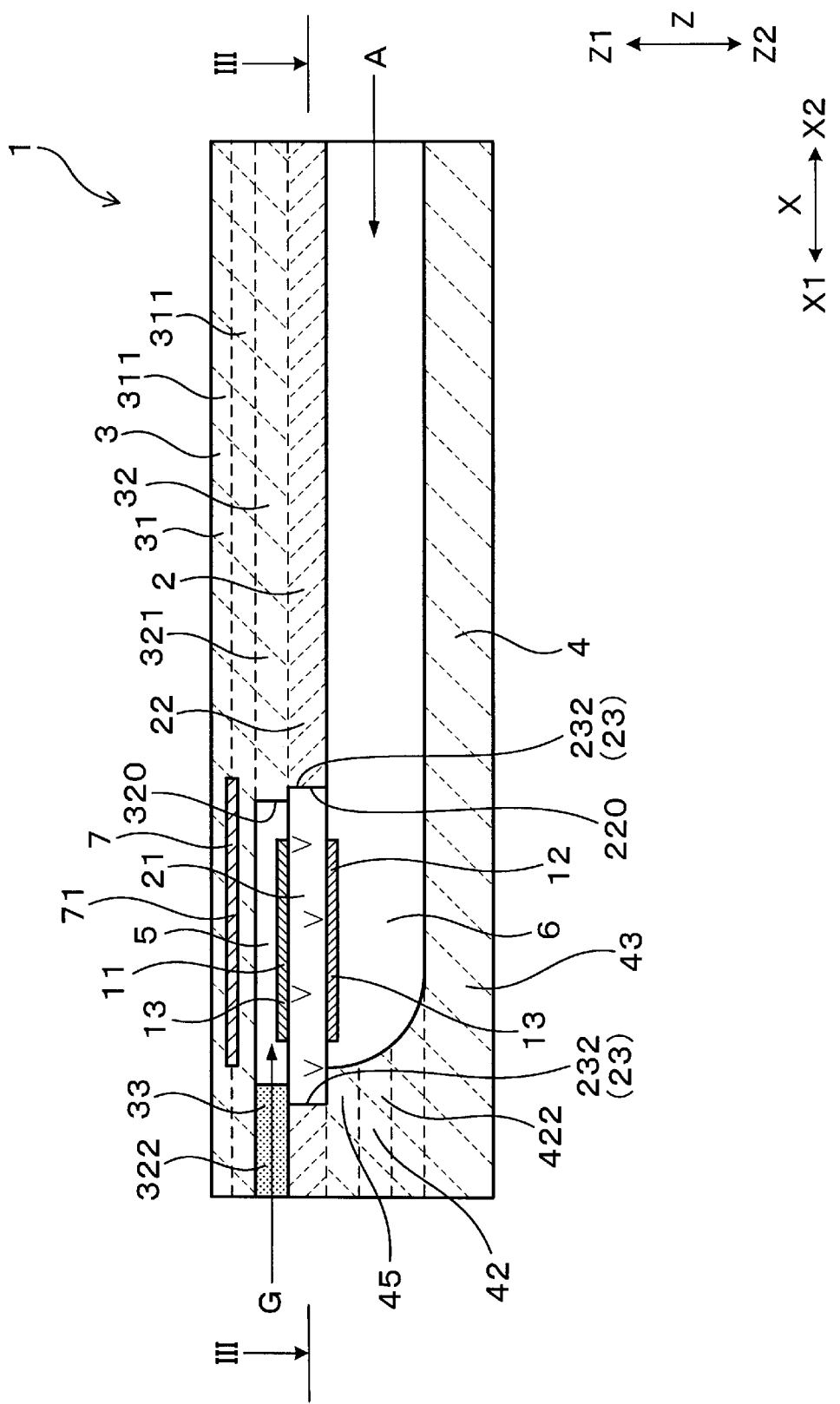
FIG. 2 is a cross-sectional view orthogonal to the width direction of the gas sensor element of the first embodiment.

As shown in FIGS. 1 and 2, the gas sensor element 1 of the present embodiment has an electrolyte layer 2, a first insulator 3, a second insulator 4, a measurement gas chamber 5, and a reference gas chamber 6. The electrolyte layer 2 includes a holding plate 22 and a solid electrolyte body 21. The holding plate 22 includes a placement hole 220 formed through the holding plate 22 in the thickness direction thereof (hereinafter, referred to as the Z direction). The solid electrolyte body 21 is disposed in the placement hole 220. The solid electrolyte body 21 has oxygen ion conductivity. The first insulator 3 is laminated on one side of the electrolyte layer 2. The second insulator 4 is laminated on the other side of the electrolyte layer 2. The measurement gas chamber 5 is surrounded by the electrolyte layer 2 and the first insulator 3. As shown in FIG. 2, the gas G to be measured is introduced into the measurement gas chamber 5. The reference gas chamber 6 is surrounded by the electrolyte layer 2 and the second insulator 4. The reference gas A is introduced into the reference gas chamber 6.

As shown in FIGS. 1 and 2, at least a part of the boundary portion 23 between the placement hole 220 and the solid electrolyte body 21 is sandwiched between a first sandwiching portion 33 of the first insulator 3 and a second sandwiching portion 45 of the second insulator 4. The first sandwiching portion 33 is formed at a position overlapping the boundary portion 23, in the Z direction. Furthermore, the first sandwiching portion 33 is formed in at least the entire region where the measurement gas chamber 5 is disposed, in the Z direction. The second sandwiching portion 45 is formed at a position overlapping the boundary portion 23, in the Z direction. Furthermore, the second sandwiching portion 45 is formed in at least the entire region where the reference gas chamber 6 is disposed, in the thickness direction. This embodiment is described in detail in the following.

Figure 5:
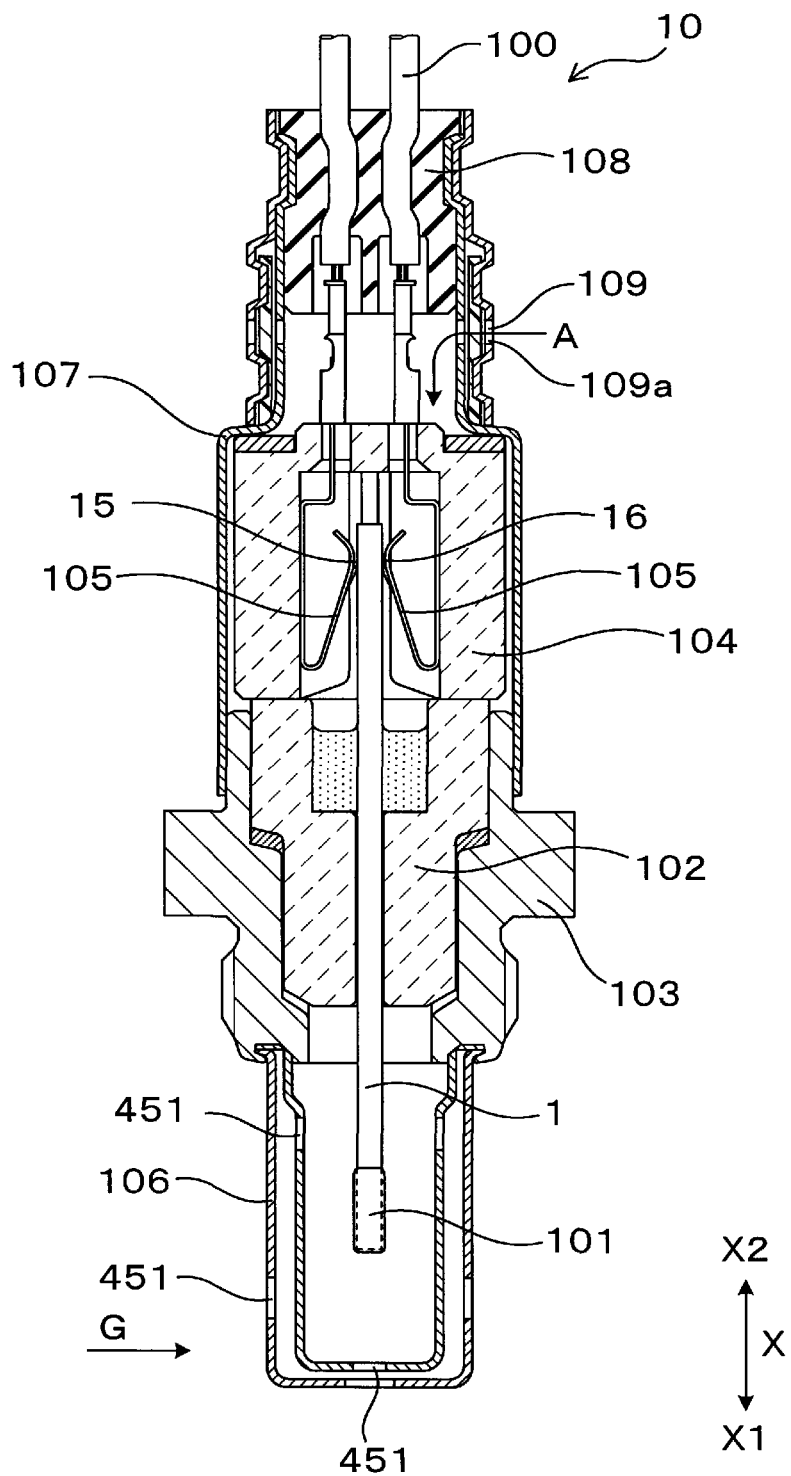
FIG. 5 is a partial cross-sectional view parallel to the axial direction of the gas sensor of the first embodiment.

As shown in FIG. 5, a gas sensor 10 having the gas sensor element 1 is disposed in an exhaust pipe (not shown) of an internal combustion engine. The gas sensor 10 Is an A/F sensor which uses the exhaust gas passing through the exhaust pipe as the gas G to be measured and atmospheric air as the reference gas A, for obtaining the oxygen concentration of the gas G to be measured, and obtains the A/F (air-fuel ratio) of the engine based on this oxygen concentration. More specifically, the gas sensor 10 may be an A/F sensor that quantitatively obtains the air-fuel ratio of the engine by utilizing a limiting current characteristic, based on the diffusion rate of the gas G to be measured.

Figure 4:
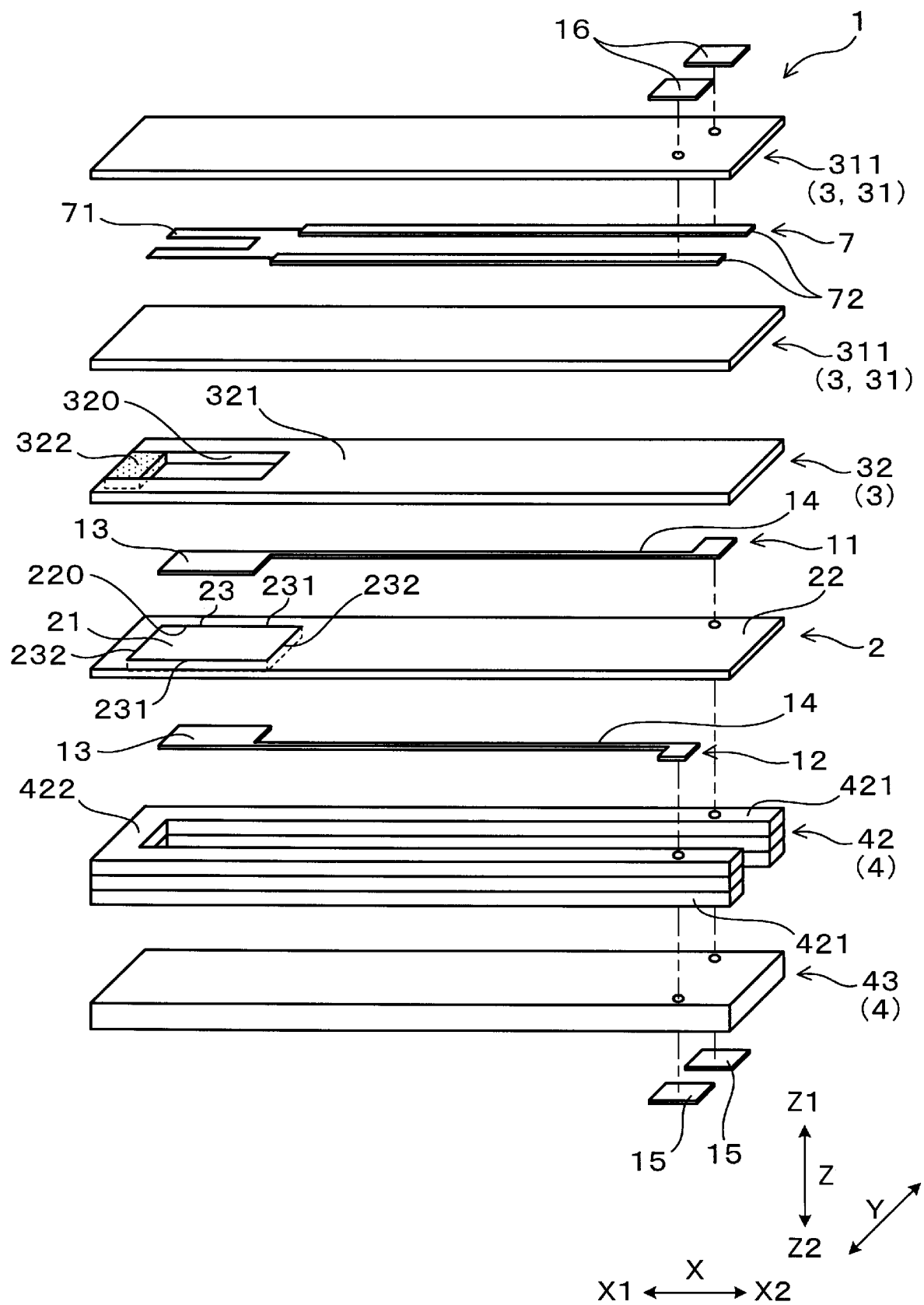
FIG. 4 is an exploded perspective view of respective layers in the gas sensor element of the first embodiment.

As shown in FIGS. 1, 2, and 4, the gas sensor element 1 is formed by laminating the first insulator 3, the electrolyte layer 2, and the second insulator 4 in the thickness direction, and sintering them. Hereinafter, the stacking direction of the first insulator 3, the electrolyte layer 2, and the second insulator 4 is referred to as the Z direction. Furthermore, in the Z direction, the side of the first insulator 3 with respect to the electrolyte layer 2, is referred to as the Z1 side, and the opposite side, that is, the side of the second insulator 4 with respect to the electrolyte layer 2, is referred to as the Z2 side. Furthermore, the longitudinal direction of the gas sensor element 1 is referred to as the X direction. In the X direction, the side at which the gas G to be measured is introduced into the gas sensor element 1 is referred to as the tip end side, and the side at which the reference gas A is introduced is referred to as the base end side. The tip end side is referred to as the X1 side, and the base end side is referred to as the X2 side, as appropriate. Furthermore, the direction orthogonal to both the X direction and the Z direction is referred to as the Y direction. The Y direction is the width direction of the gas sensor element 1. The X direction, the Y direction and the Z direction are orthogonal to one other.

Figure 3:
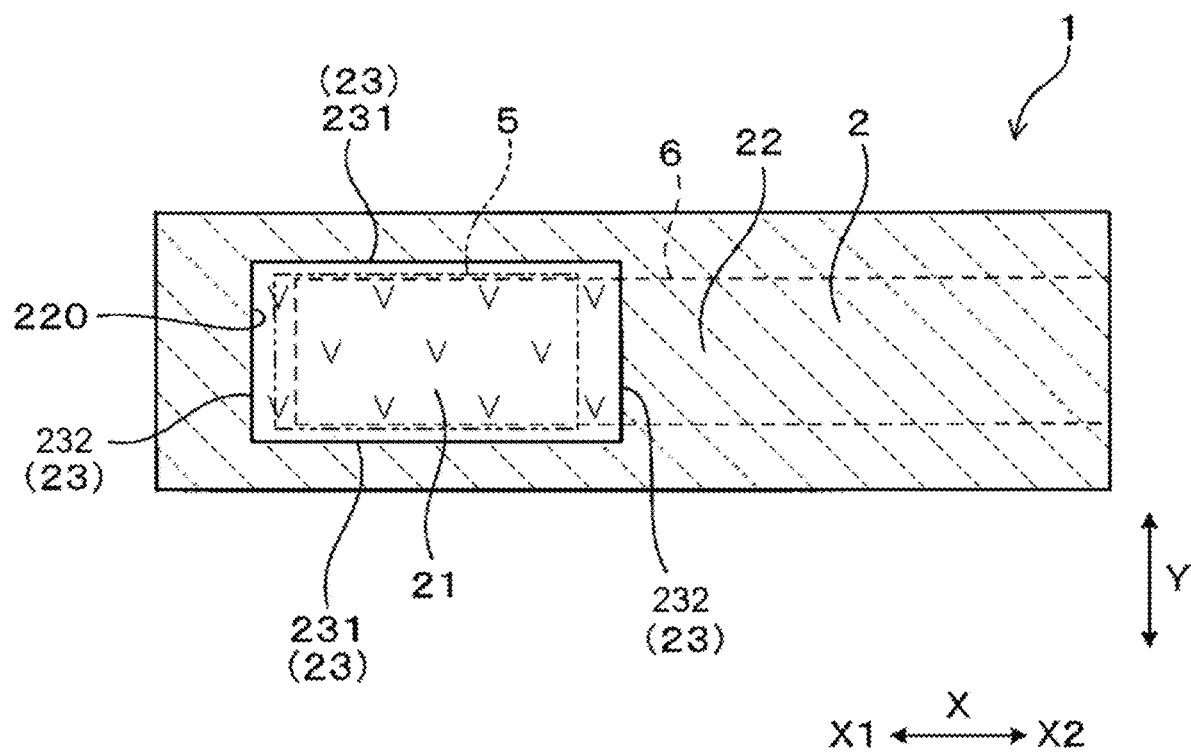
FIG. 3 is a cross-sectional view taken along the line III-III shown in FIG. 2.

As described above, the electrolyte layer 2 includes a holding plate 22 and a solid electrolyte body 21. The holding plate 22 has a plate shape that is elongated in the X direction and thick in the Z direction. In FIGS. 2 to 4, for convenience, the length of the gas sensor element 1 in the X direction is shown as being less than the actual length.

As shown in FIGS. 2 and 4, a placement hole 220 is formed in a region of the holding plate 22 on the X1 side, in the X direction. The placement hole 220 has a rectangular shape, elongated in the X direction, and is filled with the solid electrolyte body 21.

The solid electrolyte body 21 is formed of a zirconia-based oxide. The solid electrolyte body 21 comprises zirconia ($ZrO_2$) as a main component (that is, containing 50% or more by mass of zirconia) and is formed of a solid electrolyte such as stabilized zirconia or partially stabilized zirconia in which part of the zirconia is replaced by a rare earth metal element or by an alkaline earth metal element, or the like. Part of the zirconia that constitutes the solid electrolyte body 21 may be replaced by yttria ($Y_2O_3$), scandia ($Sc_2O_3$) or calcia (CaO). The holding plate 22 is made of a material having higher thermal conductivity than the solid electrolyte body 21.

As shown in FIGS. 1 and 2 a measurement electrode 11, exposed to the gas G to be measured that is introduced into the measurement gas chamber 5, is disposed on a region of the Z1 side surface of the solid electrolyte body 21, at the X1 side. Furthermore, a reference electrode 12, exposed to the reference gas A that is introduced into the reference gas chamber 6, is disposed on a region of the Z2 side surface of the solid electrolyte body 21, at the X1 side. The measurement electrode 11 and the reference electrode 12 have facing regions 13 which face one another in the Z direction via the solid electrolyte body 21. Hereinafter, the side that is opposite the X1 side in the X direction is referred to as the X2 side.

As shown in FIG. 4, each of the measurement electrode 11 and the reference electrode 12 has an electrode lead portion 14 which extends from the facing region 13 toward the X2 side. The pair of electrode lead portions 14 extend to the vicinity of the end part of the gas sensor element 1, at the X2 side. The pair of electrode lead portions 14 are connected, via through holes that are formed in the second insulator 4, to a pair of sensor terminals 15 that are formed on the Z2 side surface of the first insulator 3. The measurement electrode 11 and the reference electrode 12 are electrically connected to the exterior of the gas sensor element 1 via the pair of sensor terminals 15.

The measurement electrode 11 and the reference electrode 12 contain platinum, as a noble metal exhibiting catalytic activity for oxygen, and zirconia-based oxide, which is the same material as that of the solid electrolyte body 21. Since the measurement electrode 11 and the reference electrode 12 contain the same materials as the solid electrolyte body 21, when the electrode material in a paste-like form which constitutes the measurement electrode 11 and the reference electrode 12 is printed (coated) on the solid electrolyte body 21 and then sintered, bond strength can be readily ensured between the solid electrolyte body 21, and the measurement electrode 11 and the reference electrode 12.

As shown in FIGS. 1, 2, and 4, the first insulator 3, which is laminated on the Z1 side surface of the electrolyte layer 2, has a chamber forming portion 32 and a heater embedding portion 31, stacked in the Z direction. The chamber forming portion 32 is disposed on the Z1 side of the electrolyte layer 2. As shown in FIG. 4, the chamber forming portion 32 has an insulating spacer 321 which is recessed toward the X2 side, forming a recess 320 at the X1 side, and a diffusion resistor portion 322 disposed such as to close the open end of the recess 320 at the X1 side.

The diffusion resistor portion 322 is configured to allow the gas G to be measured to pass at a predetermined diffusion rate. The diffusion resistor portion 322 is formed of a porous metal oxide such as alumina. The exhaust gas passes, as the gas G to be measured, through the diffusion resistor portion 322 and is introduced into the measurement gas chamber 5. It would be equally possible for the diffusion resistor portion 322 to be, for example, a pinhole, i.e., a small through hole that communicates with the measurement gas chamber 5 and with the exterior of the gas sensor element 1. The position of the diffusion resistor portion 322 is not limited to that shown, and it may be formed at another position in the measurement gas chamber 5, such as at the Y side.

As shown in FIG. 2, the spatial region surrounded by the insulating spacer 321 and the diffusion resistor portion 322 in the recess 320 constitutes the measurement gas chamber 5, by being enclosed between the electrolyte layer 2 and the heater embedding portion 31 from respective sides in the Z direction. That is, a region is disposed in the Z direction within the chamber forming portion 32, to form the measurement gas chamber 5.

As shown in FIG. 3, the measurement gas chamber 5 is formed such as to fit inside the boundary portion 23 between the placement hole 220 and the solid electrolyte body 21, as viewed in the Z direction. Together with this, as shown in FIGS. 1 and 2, the chamber forming portion 32 is formed such as to cover the entire boundary portion 23 from the Z1 side. As a result, the measurement gas chamber 5 and the reference gas chamber 6 can be readily prevented from communicating with one other via the boundary portion 23 due to a decrease in the airtightness of the boundary portion 23 in the electrolyte layer 2. In FIG. 3, the outer shape of the measurement gas chamber 5 is represented by a two-dot chain line outline, and the outer shape of the reference gas chamber 6 is represented by a broken line outline.

As shown in FIGS. 1 and 2, the length of the measurement gas chamber 5 in the Z direction is less than the thickness of the electrolyte layer 2 in the Z direction. The measurement gas chamber 5 is formed such as to accommodate at least the facing region 13 of the measurement electrode 11. In the present embodiment, the measurement gas chamber 5 is formed larger than the facing region 13 of the measurement electrode 11 by the amount of one circumference of the facing region 13, as viewed in the Z direction.

As shown in FIGS. 1, 2, and 4, a heater embedding portion 31 is laminated on the Z1 side of the chamber forming portion 32. The heater embedding portion 31 is formed in the outermost part of the gas sensor element 1 at the Z1 side. The heater embedding portion 31 has a pair of embedding plates 311 stacked in the Z direction and a heater 7 embedded between the pair of embedding plates 311. That is, the heater 7 is embedded in the first insulator 3.

As shown in FIG. 4, the heater 7 has a heat generating portion 71 which generates heat when energized, and a pair of lead portions 72 connected to the heat generating portion 71. As shown in FIGS. 1 and 2, at least a part of the heat generating portion 71 is disposed in a region which overlaps the measurement gas chamber 5 in the Z direction. At least a part of the heat generating portion 71 is disposed such as to overlap the facing region 13 of the measurement electrode 11 and the facing region 13 of the reference electrode 12 in the Z direction. One part of the heat generating portion 71 is disposed at a position overlapping the measurement gas chamber 5 in the Z direction, and the other part is disposed at a position overlapping the embedding plates 311 of the chamber forming portion 32 in the Z direction. A part of the heat generating portion 71 is formed on the X2 side of the measurement gas chamber 5. That is, a part of the heat generating portion 71 overlaps, in the Z direction, with a part of the embedding plates 311 adjacent to the X2 side of the measurement gas chamber 5.

As shown in FIG. 4, the heat generating portion 71 has a shape that meanders between opposing sides in the X direction as it heads toward one side in the Y direction. However, the shape of the heat generating portion 71 is not limited to this, and may have, for example, a shape that meanders between opposing sides in the Y direction as it heads toward one side in the X direction.

A pair of lead portions 72 are formed extending from respective ends of the heat generating portion 71. The lead portions 72 are formed such as to extend to the front of the gas sensor element 1, at the X2 side. The pair of lead portions 72 are connected, via through holes in the embedding plate 311 at the X1 side, to a pair of heater terminals 16 that are formed on the surface of the embedding plate 311 at the X1 side. The heater 7 is electrically connected to the exterior of the gas sensor element 1 from the heater terminals 16.

The cross-sectional area of the heat generating portion 71 orthogonal to the forming direction is smaller than the cross-sectional area of the lead portions 72 orthogonal to the forming direction. The resistance value of the heat generating portion 71 per unit of length is greater than that of the lead portion 72. The heat generating portion 71 generates heat by Joule heating when a voltage is applied to the pair of lead portions 72. The heat that is generated thereby heats and activates the solid electrolyte body 21.

As shown in FIGS. 1, 2, and 4, the second insulator 4 which is laminated on the Z2 side surface of the electrolyte layer 2 has a duct forming portion 42 and a supporting portion 43. The duct forming portion 42 is disposed on the Z2 side surface of the electrolyte layer 2. The duct forming portion 42 is disposed to form the reference gas chamber 6, by being disposed at a region where the reference gas chamber is formed in the Z direction. The length of the duct forming portion 42 In the Z direction is greater than that of the measurement gas chamber 5. The duct forming portion 42 is formed by laminating, in the Z direction, three layers having substantially the same shape, and sintering the layers.

As shown in FIG. 4, the duct forming portion 42 is formed in a U shape that opens on the X2 side. That is, the duct forming portion 42 has a pair of long side portions 421 extending in the X direction and facing one another in the Y direction, and a short side portion 422 extending in the Y direction which connects the pair of long side portions 421 at the X1 side. As shown in FIG. 2, the surface of the short side portion 422 on the X2 side has a shape that is curved such as to head toward the X2 side as it heads toward the Z2 side. The duct forming portion 42 is longer than the measurement gas chamber 5, in the Z direction.

As shown in FIGS. 1 and 2, the spatial region inside the duct forming portion 42 that is formed by being surrounded by the electrolyte layer 2, the duct forming portion 42, and the supporting portion 43, constitutes the reference gas chamber 6. As shown in FIG. 2, the reference gas chamber 6 is formed such as to extend to the end of the gas sensor element 1 at the X2 side, and is open to the X2 side. Atmospheric air is introduced into the reference gas chamber 6 as the reference gas A, from the open part of the duct forming portion 42 at the X2 side.

As shown in FIG. 1, both ends of the reference gas chamber 6 are located inside a pair of first boundary portions 231 of the boundary portion 23, which face one another in the Y direction. The duct forming portion 42 is configured such as to cover the entire pair of first boundary portions 231, from the Z2 side. Furthermore, as shown in FIG. 2, in the X direction, the end of the reference gas chamber 6 at the X1 side is located inside the pair of second boundary portions 232 of the boundary portion 23 which face one another in the X direction. As can be seen from FIG. 3, the duct forming portion (see reference sign 42 in FIGS. 1, 2, and 4) is formed such as to cover, from the Z2 side, all of the second boundary portion 232 which is at the X1 side. Furthermore, as can be seen from FIG. 3, of the pair of second boundary portion 232 of the boundary portion 23, the duct forming portion (see reference sign 42 in FIGS. 1, 2, and 4) is formed such as to cover, from the Z2 side, both ends of the second boundary portion 232 which is at the X2 side. The length of a first boundary portion 231, as viewed from the Z direction, is greater than that of a second boundary portion 232.

As shown in FIGS. 1 and 3, the pair of first boundary portions 231 of the boundary portion 23 are sandwiched at least between the first insulator 3 and the second insulator 4 from both sides in the Z direction. Furthermore as shown in FIGS. 2 and 3, of the pair of second boundary portions 232 of the boundary portion 23, at least all of the second boundary portion 232 which is at the X1 side is sandwiched between the first insulator 3 and the second insulator 4. Moreover as can be seen from FIG. 3, both ends of the second boundary portion 232 which is at the X2 side are sandwiched between the first insulator (see reference sign 3 in FIGS. 1, 2 and 4) and the second insulator 4 (see reference sign 4 in FIGS. 1, 2 and 4). That is, all of the pair of the first boundary portion 231, all of the second boundary portion 232 which is at the X1 side, and both ends of the second boundary portion 232 which is at the X2 side, are sandwiched between the first insulator 3 and the second insulator 4 in the Z direction. The parts of the chamber forming portion 32 and the heater embedding portion 31 of the first insulator 3 that overlap the boundary portion 23 in the Z direction constitute the first sandwiching portion 33, and the parts of the duct forming portion 42 and the supporting portion 43 of the second insulator 4 that overlap the boundary portion 23 in the Z direction constitute the second sandwiching portion 45. The first insulator 3 and the second insulator 4 are respectively disposed such as to straddle the boundary portion 23, and sandwich the boundary portion 23. As shown in FIG. 2, the diffusion resistor portion 322 constitutes a part of the first sandwiching portion 33, located on the Z1 side of the second boundary portion 232 at the X1 side.

As shown in FIGS. 1 and 2, the length of the reference gas chamber 6 in the Z direction is greater than that of the measurement gas chamber 5 in the Z direction. In the present embodiment, the length of the reference gas chamber 6 in the Z direction is three or more times the length of the measurement gas chamber 5 in the Z direction, however the disclosure is not limited to this. The length of the reference gas chamber 6 in the Y direction is slightly greater than that of the reference electrode 12 in the Y direction. The reference electrode 12 is located at the center of the reference gas chamber 6, in the Y direction.

Orthogonal to the X direction, the cross-sectional area of the region in the reference gas chamber 6 on the X2 side of the short side portion 422 is larger than the cross-sectional area of the measurement gas chamber 5 orthogonal to the X direction. Furthermore, the entire reference gas chamber 6 has a larger volume than the entire measurement gas chamber 5. Due to the fact that the above-mentioned cross-sectional area, length in the in the Z direction, volume, etc. of the reference gas chamber 6 are greater those of the measurement gas chamber 5, sufficient oxygen for reacting with unburned gas in the measurement electrode 11 can be supplied to the measurement electrode 11, in the reference gas A from the reference gas chamber 6.

As shown in FIGS. 1, 2 and 4, a supporting portion 43 is laminated on the surface of the duct forming portion 42, at the Z2 side. The supporting portion 43 is formed at the part of the gas sensor element 1 that is farthest toward the Z2 side. The supporting portion 43 encloses the inner space of the duct forming portion 42, that is, the reference gas chamber 6, from the Z2 side.

In the present embodiment, the holding plate 22, the insulating spacer 321 in the chamber forming portion 32, the embedding plates 311, the duct forming portion 42, and the supporting portion 43 are made of the same material. Specifically, these are made of alumina ($Al_2O_3$) which is impermeable to the gas G to be measured.

As shown in FIG. 5, the part of the gas sensor element 1 which is at the X1 end is provided with a protective layer 101, to prevent substances that are poisonous to the measurement electrode (see reference sign 11 in FIGS. 1, 2, and 4), condensed water generated in the exhaust pipe, and the like, from entering the interior of the gas sensor element 1. The protective layer 101 is formed of a porous ceramic (metal oxide) such as alumina. The porosity of the protective layer 101 is greater than the porosity of the diffusion resistor portion 322, and the flow rate at which the gas G to be measured can pass through the protective layer 101 is greater than that at which the gas can pass through the diffusion resistor portion 322.

A gas sensor 10 having the gas sensor element 1 of the present embodiment will be described with reference to FIG. 5.

The gas sensor 10 is configured with the X direction as the axial direction. In other words, the longitudinal direction of the gas sensor element 1 is parallel to the axial direction of the gas sensor 10. The gas sensor 10 includes the gas sensor element 1, a first insulator 102, a housing 103, a second insulator 104, and a plurality of contact terminals 105. The first insulator 102 holds the gas sensor element 1. The housing 103 holds the first insulator 102. The second insulator 104 is connected to the first insulator 102. A plurality of contact terminals 105 are held by the second insulator 104 and are in contact with the sensor terminal 15 and the heater terminal 16 of the gas sensor element 1.

The gas sensor 10 is provided with a tip end cover 106 that is attached to the part of the housing 103 at the X1 side, a second insulator 104 attached to the part of the housing 103 at the X2 side, a base end cover 107 which covers the contact terminals 105 etc., a bush 108 holding lead wires 100 that are connected to the contact terminals 105 on the base end cover 107, and the like.

The tip end cover 106 is disposed such as to be exposed within the exhaust pipe of the internal combustion engine. A part of the gas sensor element 1, at the X1 end, projects inside the tip end cover 106. A gas passage hole 106a is formed in the tip end cover 106, for passing exhaust gas as the gas G to be measured. The tip end cover 106 may have a double-wall structure or a single-wall structure. The exhaust gas G to be measured flows into the tip end cover 106 from the gas passage hole 106a of the tip end cover 106, and is led to the measurement electrode 11 by passing through the protective layer 101 and through the diffusion resistor portion 322 of the gas sensor element 1.

The base end cover 107 is disposed external to the exhaust pipe of the internal combustion engine. The base end cover 107 has an air introduction hole 109 formed therein, for introducing atmospheric air as the reference gas A thereinto. A filter 109a that blocks the passage of liquid but allows gas to pass through is disposed in the atmospheric air introduction hole 109. The reference gas A that is introduced into the base end cover 107 from the air introduction hole 109 is guided to the reference electrode 12 through a gap in the base end cover 107 and through the reference gas chamber 6.

The plurality of contact terminals 105 are disposed in the second insulator 104 such as to be respectively connected to the heater terminal 16 and the sensor terminal 15. Furthermore, the lead wires 100 are connected to the contact terminals 105.

The lead wires 100 are electrically connected to a sensor control device that controls gas detection in the gas sensor 10. The sensor control device performs electrical control of the gas sensor 10 in cooperation with an engine control device that controls combustion operation in the engine. The sensor control device consists of a measurement circuit for measuring the current flowing between the measurement electrode 11 and the reference electrode 12, an application circuit for applying a voltage between the measurement electrode 11 and the reference electrode 12, and an energizing circuit for energizing the heater 7, etc. It would be equally possible to for the sensor control device to be configured in the engine control device.

The action and effects of the present embodiment will next be described. In the gas sensor 10 of the present embodiment, at least a part of the boundary portion 23 between the placement hole 220 of the holding plate 22 and the solid electrolyte body 21 is sandwiched between the first sandwiching portion 33 of the first insulator 3 and the second sandwiching portion 45 of the second insulator 4. The first sandwiching portion 33 is formed, at least in the Z direction, within the entire region in which the measurement gas chamber 5 is disposed. Furthermore, the second sandwiching portion 45 is formed, at least in the Z direction, within the entire region in which the reference gas chamber 6 is disposed. That is, at least a part of the boundary portion 23 is sandwiched between the first sandwiching portion 33 and the second sandwiching portion 45, which are composed of structures having relatively high rigidity. Hence it is easy to ensure rigidity of the first sandwiching portion 33 and the second sandwiching portion 45 which sandwich at least a part of the boundary portion 23, and stably hold the solid electrolyte body 21 in the placement hole 220.

Furthermore, the electrolyte layer 2 has a solid electrolyte body 21 and a holding plate 22. The holding plate 22 is made of a material having higher thermal conductivity than the solid electrolyte body 21. Thus, heat conduction of the electrolyte layer 2 overall can readily be enhanced. The heater 7 can therefore easily heat the solid electrolyte body 21 efficiently, and the solid electrolyte body 21 can be activated rapidly.

Furthermore, in the present embodiment, since the boundary portion 23 can be held by the chamber forming portion 32, the heater embedding portion 31, the duct forming portion 42 and the supporting portion 43, it is not necessary to dispose sheets on both sides of the boundary portion 23 for the sole purpose of holding the boundary portion 23, and hence an increase in manufacturing person-hours can be prevented and productivity can be improved.

Furthermore at least the entire pair of first boundary portions 231 of the boundary portion 23 are sandwiched between the first sandwiching portion 33 and the second sandwiching portion 45. Moreover, of the boundary portion 23, all of the second boundary portion 232 that is on the X1 side of the pair of first boundary portions 231 is sandwiched between the first sandwiching portion 33 and the second sandwiching portion 45. Hence, the boundary portion 23 can be stably held between the first sandwiching portion 33 and the second sandwiching portion 45, so that the solid electrolyte body 21 is even more easily prevented from being displaced from the placement hole 220.

Furthermore, the gas sensor element 1 has the heater 7 embedded in the first insulator 3. As a result, the reference gas chamber 6, into which the relatively low temperature reference gas A is introduced, is not disposed between the heater 7 and the solid electrolyte body 21. Hence thermal conductivity between the heater 7 and the solid electrolyte body 21 can readily be enhanced, and the solid electrolyte body 21 can be rapidly activated.

As described above, the present embodiment enables a gas sensor element to be provided in which a solid electrolyte body does not readily become displaced from a placement hole.

Second Embodiment

Figure 6:
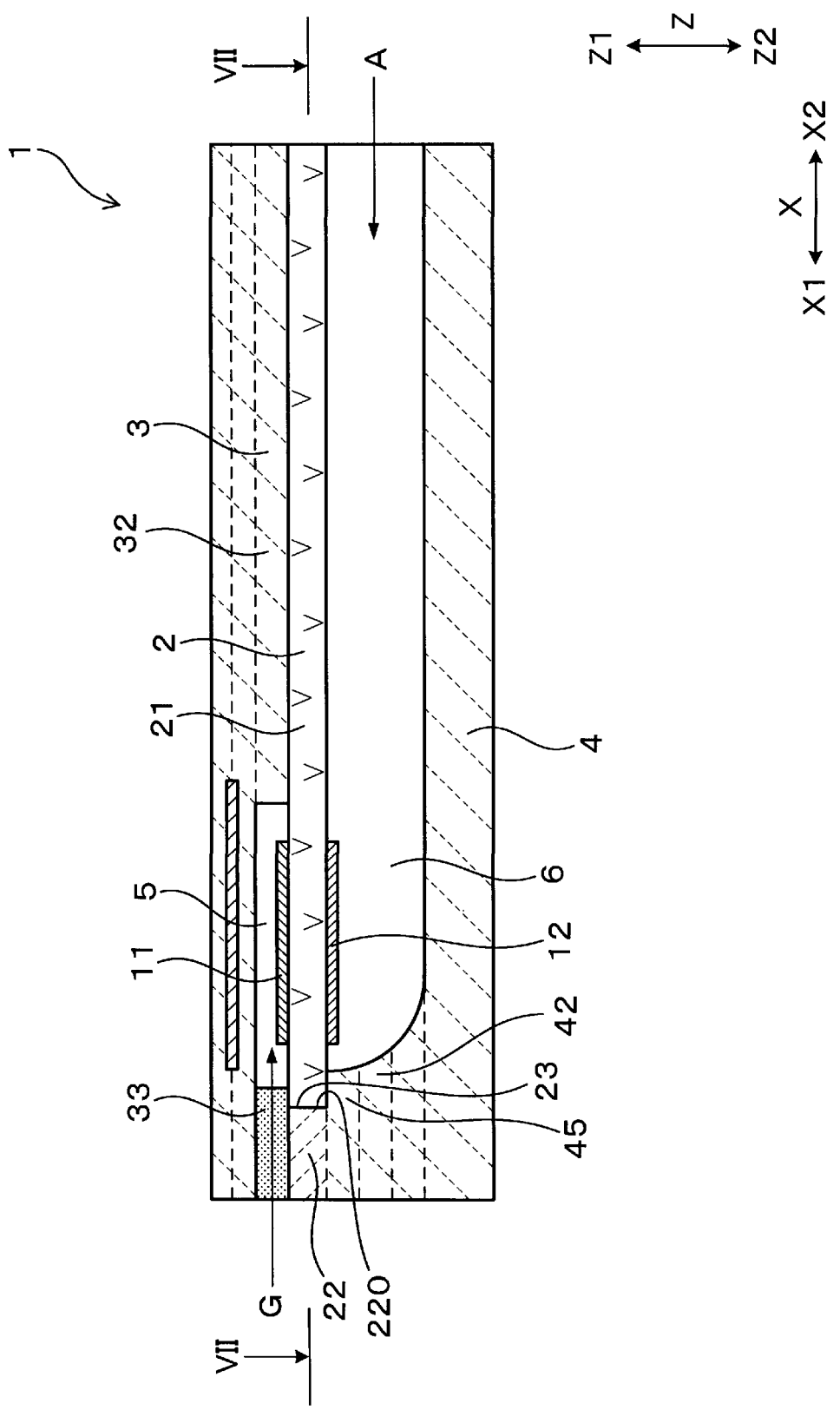
FIG. 6 is a cross-sectional view orthogonal to the width direction of the gas sensor element of a second embodiment.
Figure 7:
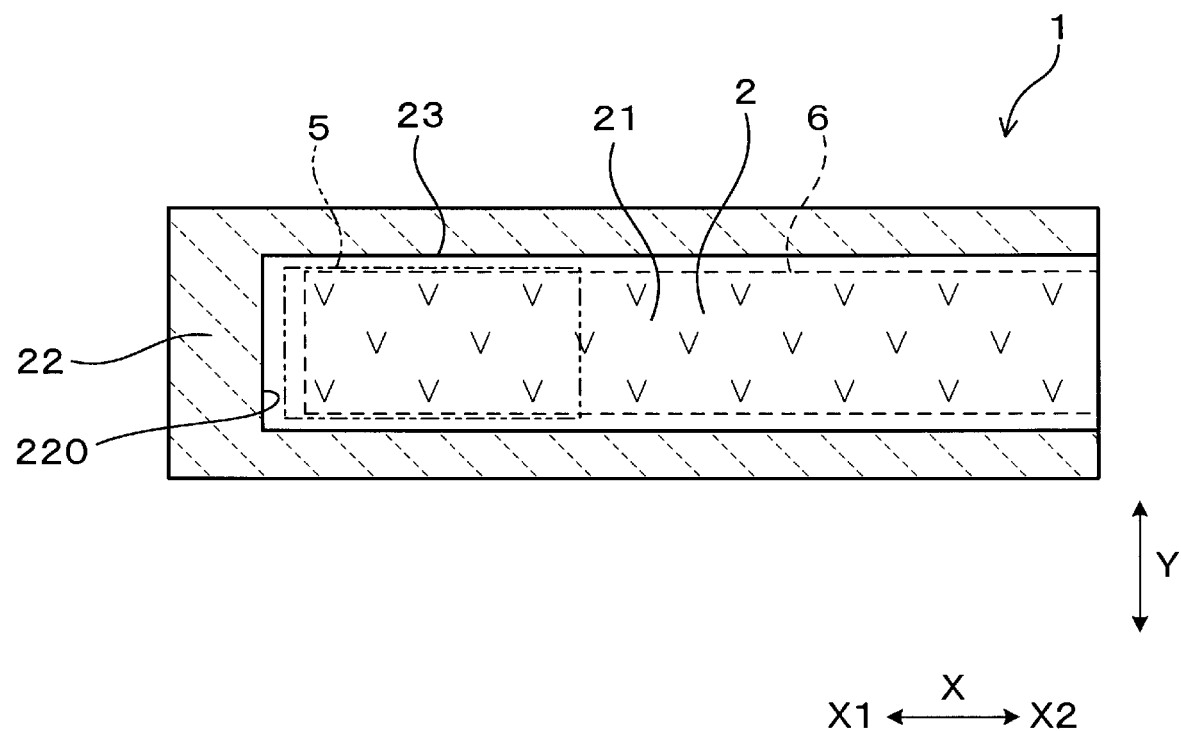
FIG. 7 is a cross-sectional view taken along the line VII-VII shown in FIG. 6.
Figure 8:
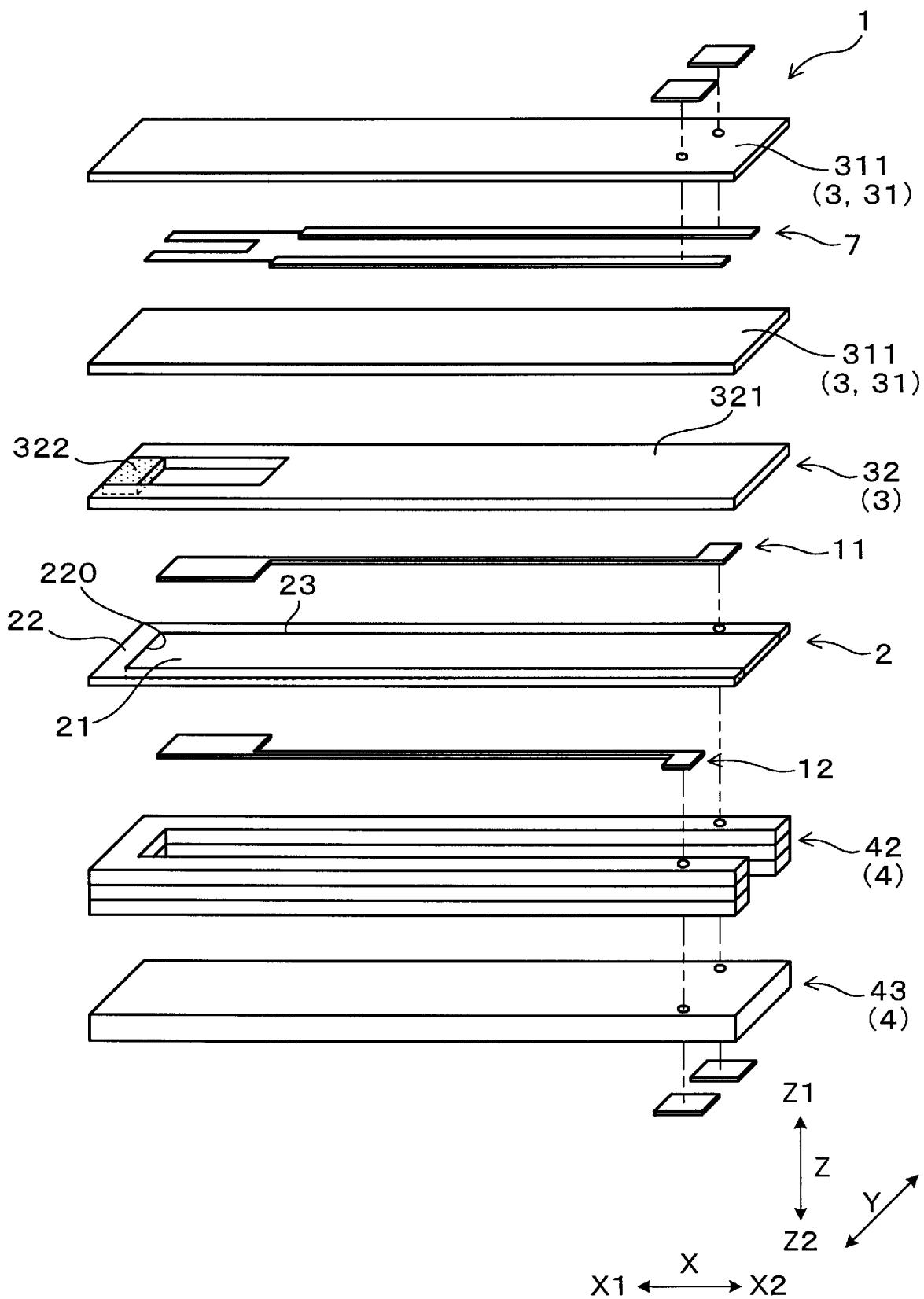
FIG. 8 is an exploded perspective view of respective layers in the gas sensor element of the second embodiment.

This embodiment is obtained by changing the shape of the electrolyte layer 2 of the first embodiment, as shown in FIGS. 6-8.

As shown in FIGS. 7 and 8, the holding plate 22 is formed in a U-shape which is open to the X2 side. The region inside the U-shaped holding plate 22 constitutes a placement hole 220, for disposing the solid electrolyte body 21. The placement hole 220 is formed up to the end of the holding plate 22 at the X2 side, and is open to the X2 side.

As shown in FIGS. 6 to 8, the placement hole 220 is filled with the solid electrolyte body 21. The end of the solid electrolyte body 21 which is at the X2 side is formed such as to extend to the position of the end of the holding plate 22 which is at the X2 side. The end of the solid electrolyte body 21 which is at the X2 side is not in contact with the holding plate 22, and is exposed from the holding plate 22 at the X2 side. The boundary portion 23 is formed between the placement hole 220 and the solid electrolyte body 21, other than for the end of the solid electrolyte body 21 which is at the X2 side.

In the present embodiment, as shown in FIGS. 6 and 7, the entire boundary portion 23 is sandwiched between the first sandwiching portion 33 and the second sandwiching portion 45.

That is, the entire boundary portion 23 is covered from the Z1 side by the chamber forming portion 32, which constitutes the first sandwiching portion 33, and is covered from the Z2 side by the duct forming portion 42, which constitutes the second sandwiching portion 45.

In other respects, this embodiment is identical to the first embodiment.

Unless otherwise specified the reference signs used in the second and subsequent embodiments designate the same components, etc., as when used for preceding embodiments.

In the present embodiment, the entire boundary portion 23 is sandwiched between the first sandwiching portion 33 and the second sandwiching portion 45. The boundary portion 23 can thereby be held with greater stability.

In other respects, this embodiment provides the same effects as for the first embodiment.

Although the present disclosure has been described based on embodiments, it is to be understood that the disclosure is not limited to such embodiments or structures. The scope of the present disclosure also includes various modified examples, and modifications that are within a range of equivalents. In addition, various combinations and forms, including other combinations and forms containing only a single element, or containing more or fewer elements, are included in the category and conceptual scope of the present disclosure.

For example, in each of the above embodiments, the gas sensor could be a concentration type of cell, which detects whether the air/fuel ratio of the engine is in an excess-fuel rich state or an excess-air lean state with respect to the stoichiometric air-fuel ratio, where the air/fuel ratio is the mixture ratio of fuel and air in the engine. Alternatively, the gas sensor could be other than an A/F sensor, such as a NOx sensor that detects the NOx concentration in the exhaust gas. When the gas sensor is used as a NOx sensor, a pump electrode and a measurement electrode are provided at the X1 end of the solid electrolyte body, on the surface of the solid electrolyte body which is on the measurement gas chamber side, with the pump electrode being provided for adjusting the oxygen concentration in the measurement gas chamber to be no greater than a predetermined concentration, and the measurement electrode being provided for measuring the NOx concentration. With the gas sensor element in that case, the NOx concentration is obtained from the value of a current, which is in accordance with the NOx concentration in the measurement gas flowing between the measurement electrode and the reference electrode.

What is claimed is:

1. A gas sensor element comprising
an electrolyte layer having a holding plate with a placement hole formed in the thickness direction thereof, and a solid electrolyte body disposed in the placement hole and having oxygen ion conductivity,
a first insulator laminated on one side of the electrolyte layer,
a second insulator laminated on the other side of the electrolyte layer,
a measurement gas chamber that is surrounded by the electrolyte layer and the first insulator, and into which a gas to be measured is introduced, and
a reference gas chamber that is surrounded by the electrolyte layer and the second insulator, and into which a reference gas is introduced,
wherein:
at least a part of a boundary portion between the placement hole and the solid electrolyte body is sandwiched between a first sandwiching portion of the first insulator and a second sandwiching portion of the second insulator;
the first sandwiching portion is formed, in the thickness direction, at a position overlapping the boundary portion, and is formed, at least in the thickness direction, in the entire region where the measurement gas chamber is disposed,
the second sandwiching portion is formed, in the thickness direction, at a position overlapping the boundary portion, and is formed, at least in the thickness direction, in the entire region where the reference gas chamber is disposed, and
the boundary portion has a pair of first boundary portions which face one another in the width direction of the gas sensor element,
the solid electrolyte body and the reference gas chamber are formed up to a position of a base end of the gas sensor element in the longitudinal direction, and
at least the entire pair of first boundary portions are sandwiched between the first sandwiching portion and the second sandwiching portion up to the position of the base end of the gas sensor element in the longitudinal direction.

2. The gas sensor element according to claim 1, wherein the boundary portion has a pair of second boundary portions which face one another in the longitudinal direction of the gas sensor element and
at least all of the one of the pair of second boundary portions which is a tip end side, in the longitudinal direction, is sandwiched between the first sandwiching portion and the second sandwiching portion.

3. The gas sensor element according to claim 1, wherein the entire boundary portion is sandwiched between the first sandwiching portion and the second sandwiching portion.

4. The gas sensor element according to claim 1, further comprising a heater embedded in the first insulator.

5. The gas sensor element according to claim 1, wherein the electrolyte layer is longer than the measurement gas chamber in the longitudinal direction of the gas sensor element.

6. The gas sensor element according to claim 1, wherein the electrolyte layer is longer than the measurement gas chamber in the width direction of the gas sensor element.

7. The gas sensor element according to claim 1, wherein the electrolyte layer is longer than the reference gas chamber in the width direction of the gas sensor element.

8. A gas sensor element comprising
an electrolyte layer having a holding plate with a placement hole formed in the thickness direction thereof, and a solid electrolyte body disposed in the placement hole and having oxygen ion conductivity,
a first insulator laminated on one side of the electrolyte layer,
a second insulator laminated on the other side of the electrolyte layer,
a measurement gas chamber that is surrounded by the electrolyte layer and the first insulator, and into which a gas to be measured is introduced, and a reference gas chamber that is surrounded by the electrolyte layer and the second insulator, and into which a reference gas is introduced, wherein:

at least a part of a boundary portion between the placement hole and the solid electrolyte body is sandwiched between a first sandwiching portion of the first insulator and a second sandwiching portion of the second insulator;

the first sandwiching portion is formed, in the thickness direction, at a position overlapping the boundary portion, and is formed, at least in the thickness direction, in the entire region where the measurement gas chamber is disposed, the second sandwiching portion is formed, in the thickness direction, at a position overlapping the boundary portion, and is formed, at least in the thickness direction, in the entire region where the reference gas chamber is disposed, the boundary portion has a pair of first boundary portions which face one another in the width direction of the gas sensor element, at least the entire pair of first boundary portions are sandwiched between the first sandwiching portion and the second sandwiching portion, and the electrolyte layer is longer than the measurement gas chamber in the width direction of the gas sensor element.

9. A gas sensor element comprising an electrolyte layer having a holding plate with a placement hole formed in the thickness direction thereof, and a solid electrolyte body disposed in the placement hole and having oxygen ion conductivity, a first insulator laminated on one side of the electrolyte layer, a second insulator laminated on the other side of the electrolyte layer, a measurement gas chamber that is surrounded by the electrolyte layer and the first insulator, and into which a gas to be measured is introduced, and a reference gas chamber that is surrounded by the electrolyte layer and the second insulator, and into which a reference gas is introduced, wherein:

at least a part of a boundary portion between the placement hole and the solid electrolyte body is sandwiched between a first sandwiching portion of the first insulator and a second sandwiching portion of the second insulator;

the first sandwiching portion is formed, in the thickness direction, at a position overlapping the boundary portion, and is formed, at least in the thickness direction, in the entire region where the measurement gas chamber is disposed, the second sandwiching portion is formed, in the thickness direction, at a position overlapping the boundary portion, and is formed, at least in the thickness direction, in the entire region where the reference gas chamber is disposed, the boundary portion has a pair of first boundary portions which face one another in the width direction of the gas sensor element, at least the entire pair of first boundary portions are sandwiched between the first sandwiching portion and the second sandwiching portion, and the electrolyte layer is longer than the reference gas chamber in the width direction of the gas sensor element.

* * * * *